United States Patent Office 2,745,883
Patented May 15, 1956

2,745,883

PRODUCTION OF TRICHLOROBENZENES

Theodore M. Jenney, Kenmore, N. Y., assignor to Olin Mathieson Chemical Corporation, a corporation of Virginia No Drawing. Application May 19, 1951,
Serial No. 227,270

6 Claims. (Cl. 260—650)

My invention relates to a novel process of preparing mixed trichlorobenzenes from crude benzene hexachloride or residues resulting from the separation of the gamma isomer from crude benzene hexachloride.

In the production of benzene hexachloride by the addition reaction of chlorine and benzene, several isomers are formed including usually 10-14% of gamma isomer. The gamma isomer is the only insecticidally active isomer of benzene hexachloride and the crude mixture owes its activity to its content of this isomer. For many purposes the crude mixture is utilizable as such, but for other purposes a concentrate of gamma isomer or substantially pure gamma isomer is preferred. In the production of gamma isomer concentrates or pure gamma isomer, residues of other isomers are obtained. Since approximately 85% of the yield of benzene hexachloride is separated as inactive isomers where the gamma isomer is the desired product, economic uses must be found for these isomers in order to make feasible the production of pure gamma isomer. One of the important uses of inactive isomers is their conversion to trichlorobenzenes, useful as solvents, insulating liquids and for various organic syntheses.

It has long been known that trichlorobenzenes may be obtained by the dehydrochlorination of benzene hexachloride isomers. The isomers may be dehydrochlorinated by heating alone or by the action of alcoholic potash or alcoholic soda. On a commercial scale it is advantageous generally to avoid the use of a solvent where possible because its use entails recovery, always an expensive operation. Dehydrochlorination of benzene hexachloride in aqueous suspension using caustic soda or lime at temperatures of 80-105° C. shows that several hours are required to obtain much dehydrochlorination. With 15% caustic soda at 105° C. about 7 hours is required to remove 40% of the original chlorine or 80% of the theoretical amount to be removed by the dehydrochlorination to form trichlorobenzenes. Milk of lime at 100° C. required about 18.5 hours to remove 40% of the original chlorine and at 80° C. less than 25% of the original chlorine was removed in 30 hours.

I have discovered an improved process for the production of trichlorobenzenes by the dehydrochlorination of crude benzene hexachloride or any mixture of benzene hexachloride isomers, such as the mixture resulting as a residue after the extraction of the gamma isomer, which comprises treating benzene hexachloride with dilute aqueous alkali metal or alkaline earth metal hydroxide solution in the presence of a surface-active agent stable in the presence of the dilute hydroxide solution. My process provides an extremely rapid and inexpensive method of dehydrochlorinating benzene hexachloride to form trichlorobenzenes, and further provides a method for the isolation of the beta isomer of benzene hexachloride, for substantially pure beta benzene hexachloride remains as a solid residue when the dehydrochlorination reaction is discontinued. This latter feature, that is, the isolation of beta-benzene hexachloride from a mixture of benzene hexachloride isomers, is possible because substantially complete dehydrochlorination of the other benzene hexachloride isomers is effected before any substantial dehydrochlorination of the beta isomer takes place. Therefore, by discontinuing the reaction when substantially complete dehydrochlorination of the isomers other than the beta isomer has been accomplished, substantially pure beta-benzene hexachloride can be recovered as a solid residue.

In accordance with my process, the benzene hexachloride to be dehydrochlorinated is mixed with dilute aqueous hydroxide solution containing sufficient alkali metal or alkaline earth metal hydroxide to effect the dehydrochlorination of the benzene hexachloride and a minor amount of a surface active agent stable in the presence of the dilute hydroxide solution. The reaction mixture is subjected to thorough agitation throughout the dehydrochlorination reaction which is usually carried out at the reflux temperature of the mixture at atmospheric pressure. Normally this will not be less than about 90° C. nor more than about 110° C. While the process is preferably accomplished at atmospheric pressure because simpler and cheaper equipment is required, an even faster reaction rate can be obtained under superatmospheric pressures. Under superatmospheric pressure conditions the temperatures are increased proportionally to the increase in pressure. The dehydrochlorination reaction is discontinued after a period of about one hour or slightly less to about three hours, the actual time of reaction depending on the particular reaction conditions. After the dehydrochlorination reaction is discontinued, the resulting trichlorobenzenes are recovered from the oil layer of the reacted mixture, for example, by steam distillation of the oil layer, and beta benzene hexachloride is recovered from the reacted mixture as a solid residue.

A surface active agent which is stable in the presence of the aqueous hydroxide solution should be present in the dehydrochlorination mixture in a minor amount of at least about 0.01 weight per cent based on the benzene hexachloride in order to obtain the substantial improvement of the dehydrochlorinating action of the aqueous hydroxide solution. About 0.05 to 1.5 weight per cent of the surface active agent gives optimum results from the standpoint of heating requirements and reaction time of the dehydrochlorination reaction. However, the use of amounts in excess of about 1.5 weight per cent based on the benzene hexachloride may cause the formation of an emulsion of the reaction mixture and the trichlorobenzene reaction products and, therefore, should be avoided.

Suitable surface active agents which are stable to dilute hydroxide solutions are particularly the alkyl aryl sulfonates exemplified by Ultrawet-K (a sodium alkyl benzene sulfonate) or other surface active agents containing no saponifiable groups. Another suitable surface active agent is the product of condensing chlorinated kerosene with benzene in the presence of AlCl₃, sulfonating and neutralizing with alkali to form sodium keryl benzene sulfonate. Sodium nonyl naphthalene sulfonate is another commercially available surface active agent suitable for use in my process.

My dehydrochlorination process has several important advantages. The dehydrochlorination rate is increased substantially over the rate accomplished by known processes using aqueous hydroxide solutions, and the dehydrochlorination reaction is substantially self-sufficient in regard to heat requirements since the reaction proceeds rapidly enough to maintain an adequate temperature of the reaction mixture. The process is conducted without the use of solvents and, consequently, presents no solvent recovery problems. In addition, the trichlorobenzenes that result from the dehydrochlorination of benzene hexachloride according to my process contain a predominant amount of the commercially desirable 1,2,4-isomer. The 1,2,4-isomer of trichlorobenzene is valuable as a starting material in the production of such materials as 2,4-dichlorophenoxyacetic acid and 2,4,5-trichlorophenoxyacetic acid and derivatives.

While no solvents are required in the dehydrochlorination process of my invention, I have found that the rate of the dehydrochlorination reaction in my process is increased even further by the addition of a small amount of a solvent such as a water-soluble alcohol, for example, methanol. The amount of the solvent added to produce this further acceleration of the reaction is small, not over about 5% by weight based on the water present, and this small amount of solvent can be discarded without significant loss.

The following examples will illustrate the process of my invention.

Example I

A vessel equipped with adequate means of agitation was charged with 873 parts of mixed benzene hexachloride isomers, 378 parts by weight of sodium hydroxide (an excess of 5% over the theoretical amount), 13 parts of Ultrawet-K (a sodium alkyl benzene sulfonate) and 1877 parts of water. The reaction mixture was well agitated and although no heat was supplied, the temperature rose to a maximum of 105° C. in about 0.2 hour. After slightly over one hour the reaction was discontinued. The 432 parts of oil steamed out of the mixture was analyzed by infra-red analysis and showed a composition of about 72% of 1,2,4-trichlorobenzene, 12% of 1,2,3-trichlorobenzene and about 14% of 1,3,5-trichlorobenzene. The 117 parts of solid removed from the agitator was largely beta benzene hexachloride.

Example II

Example I was repeated except that the proportion of Ultrawet-K (a sodium alkyl benzene sulfonate) was reduced to 2 parts. The reaction was conducted for 2 hours at a temperature of about 105° C. without the aid of external heat. Steam distillation of the oily layer from the reactor gave a yield of about 460 parts by weight consisting of about 68% of 1,2,4-trichlorobenzene, 13.5% of 1,2,3-trichlorobenzene and about 18.5% of 1,3,5-trichlorobenzene. The residual beta benzene hexachloride in the reaction vessel amounted to about 80 parts by weight.

Example III

Only one part by weight of Ultrawet-K (a sodium alkyl benzene sulfonate) was used with the same charge of crude benzene hexachloride, caustic and water employed in Example I. The reaction was conducted for 3 hours and required the addition of heat to maintain the temperature at about 105° C. The oily layer was steam distilled from the reaction vessel and amounted to about 470 parts by weight. It contained about 59% of 1,2,4-trichlorobenzene, 14.5% of 1,2,3-trichlorobenzene and 26.5% of 1,3,5-trichlorobenzene. The residual beta benzene hexachloride amounted to about 125 parts by weight.

Example IV

To a suitable vessel equipped with an agitator was charged 873 parts of benzene hexachloride isomers, 378 parts of caustic soda, 1783 parts of water and 94 parts of methanol, about 5% by weight of the water charged. In addition, 13 parts of Ultrawet-K (a sodium alkyl benzene sulfonate) were added. The reaction temperature rose to about 100° C. without the addition of external heat and the reaction was conducted for about 45 minutes. The 480 parts of oil separated by steam distillation contained 77% of 1,2,4-trichlorobenzene, 14% of 1,2,3-trichlorobenzene and about 9% of 1,3,5-trichlorobenzene. The residual beta benzene hexachloride amounted to about 75 parts by weight.

In the absence of surface-active agent and solvent the same sized batch, even with excellent agitation, required 12–16 hours to obtain the same degree of completion of reaction.

I claim:

1. In the production of trichlorobenzenes by the dehydrochlorination of benzene hexachloride in suspension in a solution selected from the class consisting of aqueous alkali metal hydroxide solutions and aqueous alkaline earth metal hydroxide solutions, the improvement which comprises incorporating in the reaction mixture a minor amount of at least about 0.01 weight percent based on the benzene hexachloride of a surface active agent which is stable in the presence of the aqueous hydroxide solution.

2. A process of producing trichlorobenzenes from benzene hexachloride by dehydrochlorination which comprises forming a suspension of benzene hexachloride in dilute aqueous sodium hydroxide, reacting said suspension at reflux temperature for a period of about ¾ hour to 3 hours with agitation in the presence of about 0.01 to 1.5 weight percent based on the benzene hexachloride of an alkyl aryl sulfonate, and recovering the trichlorobenzene from the reaction mixture.

3. The process of producing trichlorobenzenes by the dehydrochlorination of benzene hexachloride which comprises forming a suspension of benzene hexachloride in dilute aqueous sodium hydroxide, reacting said suspension at reflux temperature for a period of about ¾ hour to 3 hours with agitation in the presence of about 0.01 to 1.5 weight percent based on the benzene hexachloride of an alkyl aryl sulfonate, and about 5 weight percent of methanol based on the water present in the suspension.

4. The process of claim 1 in which the surface-active agent is an alkyl aryl sulfonate.

5. The process of claim 1 in which the surface-active agent is a sodium alkyl benzene sulfonate.

6. In the production of trichlorobenzenes from benzene hexachloride by the dehydrochlorination of benzene hexachloride in the presence of a solution selected from the class consisting of aqueous alkali metal hydroxide solutions and aqueous alkaline earth metal hydroxide solutions, the improvement which comprises incorporating in the benzene hexachloride-aqueous hydroxide mixture a minor amount of at least 0.01 weight per cent based on the benzene hexachloride of a surface-active agent which is stable in the presence of the aqueous hydroxide solution and conducting the dehydrochlorinating reaction at a temperature within the range of about 90° to about 110° C.

References Cited in the file of this patent

FOREIGN PATENTS

| | | |
|---|---|---|
| 993,097 | France | July 18, 1951 |
| | (3 pages) | |

OTHER REFERENCES

"Chemical Abstracts," vol. 44, col. 10245 (1950). Abstract of article by Nakajima et al.

Schwartz et al.: "Surface Active Agents," pp. 513–14 (1949).